United States Patent

[11] 3,602,888

| [72] | Inventors | Akira Nishiyama<br>Osaka;<br>Hirokazu Yoshino, Kitakawachi-gun;<br>Tomio Yoshida, Kitakawachi-gun; Tetsuo<br>Yamaguchi, Kadoma-shi, all of, Japan |
|------|-----------|---|
| [21] | Appl. No. | 782,318 |
| [22] | Filed | Dec. 9, 1968 |
| [45] | Patented | Aug. 31, 1971 |
| [73] | Assignee | Matsushita Electric Industrial Co., Ltd.<br>Osaka, Japan |
| [32] | Priority | Dec. 14, 1967, Nov. 20, 1968 |
| [33] | | Japan |
| [31] | | 42/81665 and 43/85748 |

[54] LEARNING DEVICE
4 Claims, 6 Drawing Figs.

[52] U.S. Cl. ................................................. 340/172.5, 340/174
[51] Int. Cl. ........................................................ G06f 15/18
[50] Field of Search ............................................ 340/172.5, 174

[56] References Cited
UNITED STATES PATENTS

| 3,174,032 | 3/1965 | White | 340/172.5 X |
| 3,196,415 | 7/1965 | Brain | 340/174 |
| 3,267,439 | 8/1966 | Bonnet | 340/172.5 |
| 3,360,778 | 12/1967 | Farrell | 340/172.5 |
| 3,374,470 | 3/1968 | Rohland | 340/172.5 |
| 3,395,395 | 7/1968 | Gamblin et al. | 340/172.5 |
| 3,414,885 | 12/1968 | Muller | 340/172.5 |
| 3,446,950 | 5/1969 | King et al. | 340/172.5 X |
| 3,457,552 | 7/1969 | Asendorf | 340/172.5 |

OTHER REFERENCES

G. L. Clapper, " Machine Looks, Listens, Learns," Electronics, Oct. 30, 1967, pages 91 to 102.

*Primary Examiner*—Paul J. Henon
*Attorney*—Stevens, Davis, Miller & Mosher

ABSTRACT: A learning device having a plurality of magnetic cores which serve as multistage level weight memory elements. In the device, the product of an input and a corresponding weight is delivered from the magnetic core in the form of a digital output, and the sum of digital outputs is compared with a threshold value in a decision circuit to derive an error signal so that the weight carried by each magnetic core can fully automatically be corrected until the actual output coincides with an expected output.

LEARNING DEVICE

This invention relates to learning devices. Learning devices are generally provided with an adaptive logic circuit which has such a learning ability that a desired output condition can be obtained for each input condition so that a correct output response can be provided for each input condition after learning. In addition to the above, retraining can be done as required so as to deliver a new output response for a new input condition.

It is therefore a primary object of the present invention to provide a learning device which is provided with a very stable memory element for storing a weight of multistage level so that operation of a learning process for each input condition can always give a correct output response.

Another object of the present invention is to provide a stably operable saturation flux detection circuit of the feedback winding type combined with a magnetic core having an associated write-in winding.

A further object of the present invention is to provide an adaptive logic circuit employing a magnetic core as a weight element so that disappearance of or any variation in stored information does not occur even when the power supply is cut off.

Another object of the present invention is to provide a logic circuit capable of electronically performing automatic learning process until an actual output delivered from a decision element coincides with a desired output.

The above and other objects, features and advantages of the present invention will be apparent from the following description taken in conjunction with the accompanying drawings, in which.

Figure 1:
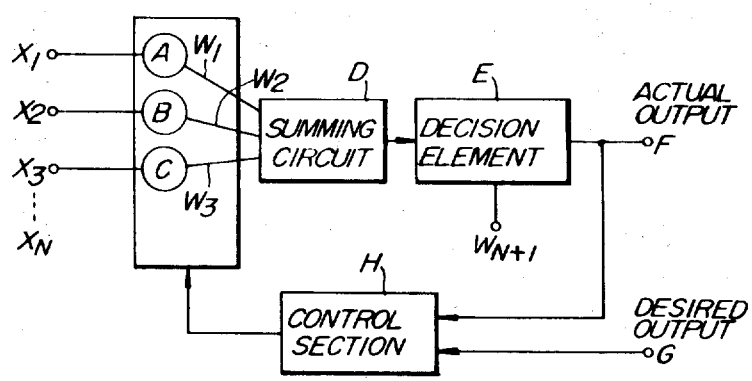
FIG. 1 is a block diagram of an adaptive logic circuit employed in prior art learning devices.

Referring to FIG. 1, an adaptive logic circuit employed in prior art learning devices comprises a plurality of weight-elements A, B and C having respective weights $W_1$, $W_2$ and $W_3$ which may, for example, be a voltage, a summing circuit D, a decision element E, an output terminal F, a desired output terminal G and a learning control section H. A plurality of input signals $X_1$, $X_2$ and $X_3$ are applied to the respective weight-elements A, B and C. The inputs $X_1$, $X_2$ and $X_3$ may be one of a set of "1" and "0" or one of a set of "1" and "−1." These values are summed up in the summing circuit D and the sum is compared in the decision element E with a threshold value $W_{n+1}$ which is variable. The output from the decision element E is "+1" and "−1" when the sum is respectively larger and smaller than the threshold value $W_{n+1}$. When the actual output is "+1" and the desired output is "−1," the learning control section H adjusts the weight so as to learn in order to give the actual output "−1." The above procedure is repeated for N input patterns each consisting of a set of numerals so that all the input patterns can be classified into two categories consisting of a class 1 and a class 2.

Figure 3:
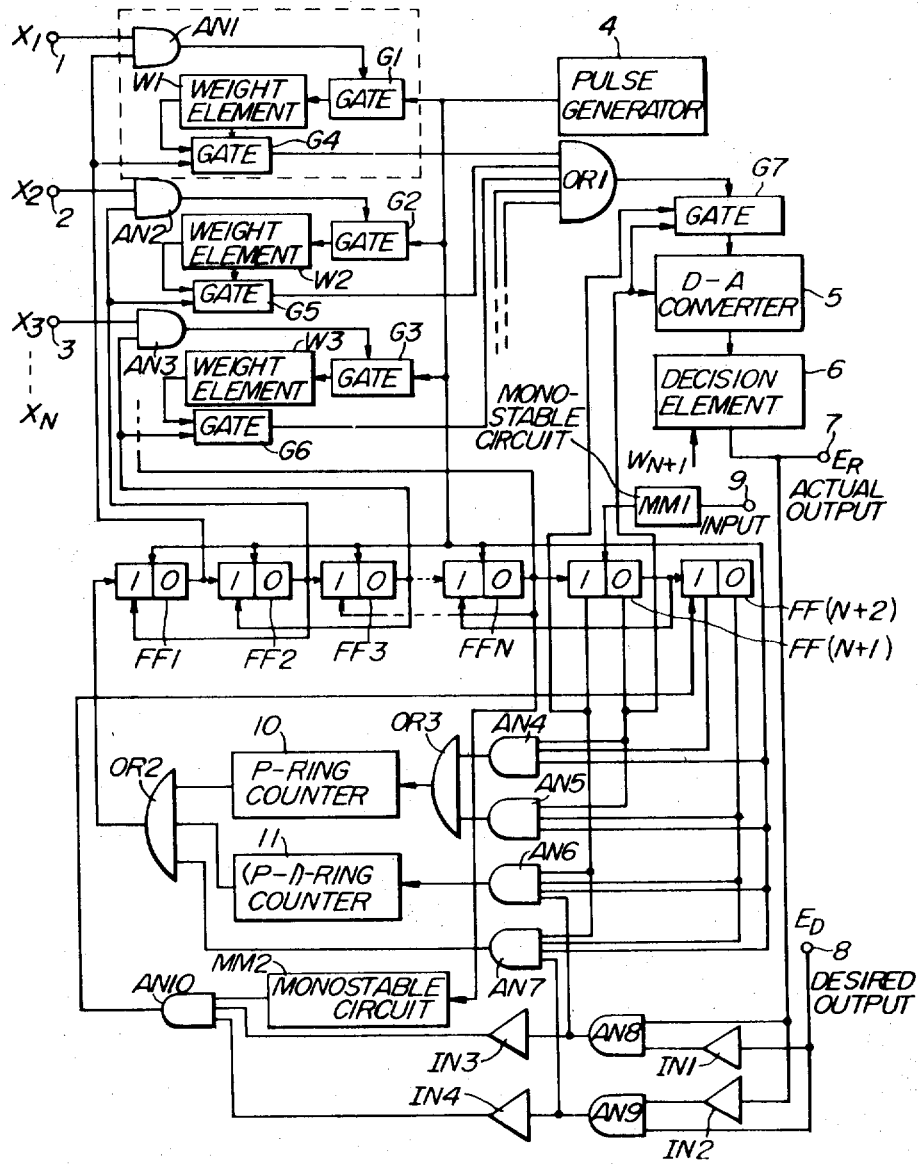
FIG. 3 is a schematic diagram of the learning device according to the present invention.

Referring to FIG. 3, inputs $X_1$, $X_2$, $X_3$,...$X_N$ are applied to respective input terminals 1, 2, 3, ...N. Here, only three input terminals 1, 2 and 3 are shown merely for the sake of simplicity. AND circuits AN1, AN2 and AN3 connect the input terminals 1, 2, 3, ... N with a selection circuit which consists of flip-flop circuits FF1, FF2, FF3,... FFN. The contents of the selection circuit are successively shifted depending on an output delivered from an OR circuit ORz. Gate circuits G1, G2 and G3 are provided to control pulses delivered from a constant-voltage pulse generator 4. Weight-elements W1, W2, and W3 employ magnetic cores for permanent memory of the weight. Gate circuits G4, G5 and G6 are arranged to open when the flux level is read out in the form of a digital quantity. A gate circuit G7 is arranged to open when the input pattern is identified and to close when the weight is educated. A digital-analog (D–A) converter 5 converts pulses sent out from an OR circuit OR1 into an analog quantity. The analog quantity $$\sum_{j=1}^{N} X_j W_j$$

is compared with a threshold value $W_{n+1}$ in a decision element 6 which delivers an output "+1" and an output "−1" when $$\sum_{j=1}^{N} X_j W_j > W_{n+1}$$

and $$\sum_{j=1}^{N} X_j W_j < W_{n+1},$$

respectively. AND circuits AN8, AN9 and inverters IN1, IN2 are provided to compare the output $E_R$ appearing at an output terminal 7 of the decision element 6 with the desired output $E_D$ applied to a terminal 8. When the output $E_R$ does not coincide with the output $E_D$, an error signal delivered from one of the AND circuits AN8 and AN9 is applied to one of AND circuits AN6 and AN7. When the actual output $E_R$ appearing at the terminal 7 coincides with the desired output $E_D$ appearing at the terminal 8, an AND circuit AN10 operates to reset a flip-flop circuit FF(N+2). A trigger signal is applied through the terminal 9 to a monostable circuit MM1. The pulse delivered from the constant-voltage pulse generator 4 appears in one of the outputs from AND circuits AN4, AN5, AN6 and AN7 through a combination of output terminals of flip-flop circuits FF(N+1) and FF(N+2). A P-ring counter 10 is connected with an OR circuit OR3 so that, upon receiving P pulses from the OR circuit OR3, it sends out one pulse to an input terminal of the OR circuit OR2. This pulse acts to shift the selection circuit consisting of the flip-flop circuits FF1, FF2, FF3, ... FFN. The AND circuits AN6 and AN7 deliver a signal for varying the weight of the weight-elements. A (P−1)-ring counter 11 is connected with the AND circuit AN6 so that, upon receiving (P−1) pulses, it supplies one pulse to an input terminal of the OR circuit OR2.

Figure 4:
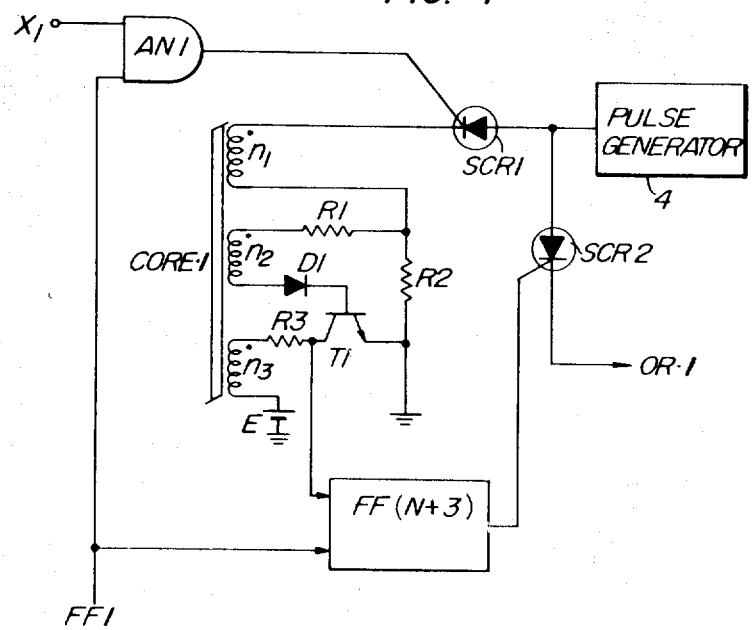
FIG. 4 is a detailed circuit diagram of a portion surrounded by the dotted lines in FIG. 3.

FIG. 4 shows the detail of the circuit portion relating to the magnetic core memory element surrounded by the dotted lines in FIG. 3. In FIG. 4, reference characters $n_1$, $n_2$ and $n_3$ denote a write-in winding, a feedback winding and a reset winding, respectively, associated with a core CORE 1; $R_1$, $R_2$ and $R_3$ resistors; $D_1$, a diode which absorbs a reverse spike of an induced voltage; T1, a transistor; and SCR1 and SCR2, silicon controlled rectifier elements. A DC voltage E is applied to the other end of the reset winding $n_3$.

Figure 5:
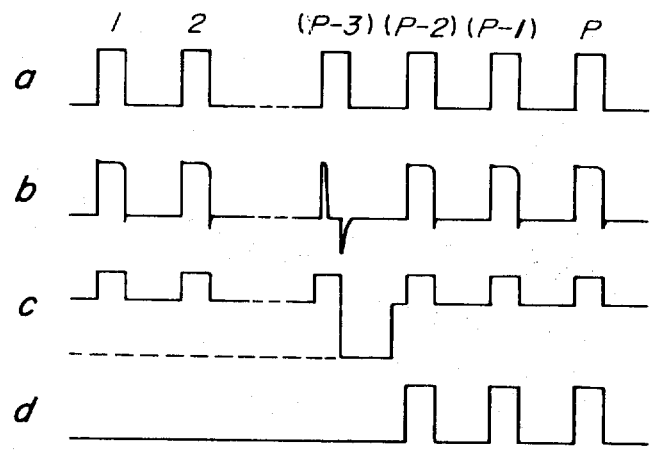
FIG. 5 is a time chart of the circuit shown in FIG. 4.

FIG. 5a shows a pulse waveform entering the write-in winding $n_1$; FIG. 5b, a voltage waveform induced in the feedback winding $n_2$; FIG. 5c, a collector voltage waveform of the transistor T1; and FIG. 5d, a pulse waveform which passes through the silicon controlled rectifier element SCR2 to enter the OR circuit OR1.

The learning device having the above-described structure operates in a manner as described below. Certain input signals $X_1$, $X_2$, $X_3$, ... (which are "1" or "0") are applied to the respective input terminals 1, 2 and 3 in FIG. 3. In this state, all the outputs from the AND circuits AN1, AN2, ... ANN remain in their low level since the input signals sent out from the selection circuit consisting of the flip-flop circuits FF1, FF2, ... FFN to enter these AND circuits are in their low level. When now a starting switch for the trigger signal input terminal 9 is turned on, the monostable circuit MM1 acts to invert the flip-flop circuit FF(N+1), and the output from the AND circuit AN4 takes its high level solely when a pulse is supplied from the constant-voltage pulse generator 4. The pulse delivered from the AND circuit AN4 passes through the OR circuit OR3 to enter the P-ring counter 10. When P pulses enter the P-ring counter 10, the P-ring counter 10 supplies one pulse to the OR circuit OR2 so that this pulse inverts the first flip-flop circuit FF1 in the selection circuit. The AND circuit AN1 takes its high level when the input $X_1$ is "+1." This signal is supplied to the gate electrode of the silicon controlled rectifier element SCR1, and the pulse delivered from the constant-voltage pulse generator 4 passes through the silicon controlled rectifier SCR1 element to enter the write-in winding $n$ of the magnetic core CORE 1. This pulse acts to vary the flux level of the magnetic core CORE 1. Suppose that $\Delta\Phi$ is the variation of magnetic flux in response to application of one pulse and $\pm\Phi_s$ is the positive and negative value of the saturation flux. Then, $$\Delta\phi = \frac{E \cdot T}{n_1}$$

$$\phi_s - (-\phi_s) = 2\phi_s = \frac{P \cdot E \cdot T}{n_1} = P \cdot \Delta\phi$$

where $E$ is the pulse voltage, $T$ is the pulse width, and $P$ is the number of pulses required for the magnetic core to reach the positive value of saturation $+\Phi_s$ from the negative value of saturation $-\Phi_s$.

Figure 2:
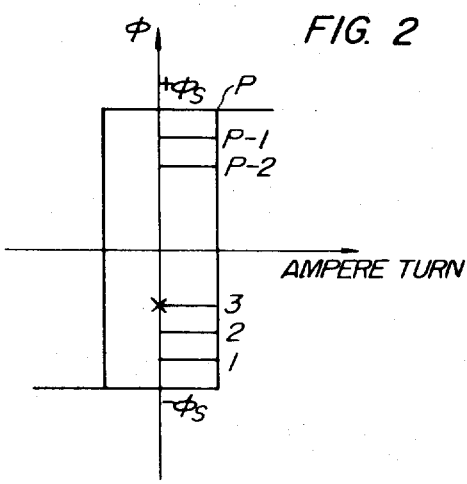
FIG. 2 is a graph showing the hysteresis curve of a magnetic core.

Assume that the flux level of the magnetic core CORE 1 lies at position 3 in FIG. 2. Then, the saturation value $+\Phi_s$ is reached when the $(P-3)$th pulse comes through the silicon controlled rectifier element SCR1 to appear in the write-in winding $n_1$. The transistor $T_1$ is urged to conduct by being driven by the spike pulse in FIG. 5b and by the pulse voltage fed from the write-in winding $n_1$ through the resistor R2. Current flow through the reset winding $n$ and the magnetic core CORE 1 is reset at its negative level. At the same time, a signal delivered from the collector of the transistor T1 in the course of resetting of the transistor T1 inverts a flip-flop circuit FF(N+3). As a result, the silicon controlled rectifier element SCR2 is opened and the $(P-4)$th and following pulses pass through the silicon controlled rectifier element SCR2 to enter the OR circuit OR1. The flux level level of the magnetic core CORE 1 starts to increase as the $(P-4)$th and following pulses appear. On the other hand, when 2P pulses are supplied to the P-ring counter 10 through the AND circuit AN4 and the OR circuit OR3, the second pulse enters the OR circuit OR2, and this pulse resets the flip-flop circuit FF1 to its original state. As a result, the flip-flop circuit FF2 is now inverted. In the meantime, P pulses are supplied to the magnetic core CORE 1 through the silicon controlled rectifier element SCR1, and $P-(P-3)=3$ pulses enter the OR circuit OR1 through the silicon controlled rectifier element SCR2 to maintain the flux level of the magnetic core CORE 1 at the previous state or the position 3. Then, the flux level of a magnetic core CORE 2 is read out by the inversion of the flip-flop circuit FF2, and similar operation is successively effected until the flux level of the last magnetic core CORE N is read out. In this connection, it will be noted that the flux level is read out in the form of the digital quantity only when the input signals $X_1, X_2, ... X_N$ are "+1." When the inputs $X_1, X_2, ... X_N$ are "0," the flux level draws a loop to return to the original state and no pulse enters the OR circuit OR1. Respective pulses supplied to the OR circuit OR1 are fed through the gate circuit G7 into the D-A converter 5, and the value of $$\sum_{j=1}^{N} X_j W_j$$

in the form of an analog quantity is fed into the decision element 6. In the decision element 6, $$\sum_{j=1}^{N} X_j W_j$$

is compared with the threshold value $W_{N+1}$, and "+1" appears at the output terminal 7 when $$\sum_{j=1}^{N} X_j W_j > W_{N+1},$$

while "−1" appears at the output terminal 7 when $$\sum_{j=1}^{N} X_j W_j < W_{N+1}.$$

The above operation is ended when an $(N+1)P$th pulse appears. The $(N+1)P$th pulse acts to reset the flip-flop circuit FF(N+1) to its original state, and in turn, the flip-flop circuit FF(N+2) is now inverted. In this case, signals at high levels leaving the flip-flop circuits FF(N+1) and FF(N+2) enter the AND circuits AN6 and AN7, respectively.

The above operation can be summarized as follows:

| | (i) | (ii) | (iii) | (iv) |
|---|---|---|---|---|
| Actual output at 7 | +1 | +1 | −1 | −1 |
| Desired output at 8 | +1 | −1 | +1 | −1 |
| Learning | Not required. | Required. | Required. | Not required. |
| Increase or decrease in weight. | | Decrease | Increase | |

In the case of (i) and (iv) in the above table, the AND circuits AN8 and AN9 takes their low level and do not send pulses to the AND circuits AN6 and AN7. However, an output signal delivered from the AND circuit AN10 resets the flip-flop circuit FF(N+2) to complete all the operation at this time. In the case of (ii), it is apparent that a known method of error correction for decreasing the weight may be employed in order to bring about a coincidence between the actual output and the desired output. In this case, the output from the AND circuit AN8 apparently takes its high level. When the pulse from the constant-voltage pulse generator 4 enters the AND circuit AN6, this pulse appears at the output of the AND circuit An6 to be supplied to the $(P-1)$-ring counter 11. As $(P-1)$ pulses enter the $(P-1)$-ring counter 11, it supplies one pulse to the OR circuit OR2 and an operation entirely similar to the above takes place so that $(P-1)$ pulses are supplied to the magnetic core to which "+1" is applied. As a result, the flux level representing the weight is stepped down by one step. In the case of (iii), the situation is opposite to the case of (ii). That is, the output from the AND circuit AN9 takes its high level, and a pulse appears at the output of the AND circuit AN7 as in the case of the AND circuit AN6. As a result, the flip-flop circuits FF1, FF2, ... FFN forming the selection circuit are shifted as one pulse after another is applied. In this case, the flux level of the magnetic core corresponding to "+1" of the input signals is now stepped up by one step to complete the learning process. At the completion of the learning process in the case of (ii) and (iii), a signal delivered from the flip-flop circuit FFN inverts the flip-flop circuit FF(N+1), and the pulse delivered from the constant-voltage pulse generator 4 appears at the output of the AND circuit AN5 and enters the P-ring counter 10 through the OR circuit OR3. The gate G7 is opened again and the D-A converter 5 is reset as soon as the flip-flop circuit FF(N+1) is inverted. The same operation as that described previously takes place to read out the value of $$\sum_{j=1}^{N} X_j W_j$$

after completion of the learning process. At the completion of the above operation, a pulse delivered from the flip-flop circuit FFN resets the flip-flop circuits FF(N+1) and FF(N+2) to complete the whole operation.

From the foregoing description it will be understood that the present invention provides a novel and improved learning device which comprises a stable weight memory element consisting of the combination of a magnetic core and a transistor. The learning device according to the present invention is advantageous in that the stored information does not disappear even in a no-power state due to power line trouble or any other cause and in that a learning process can automatically be effected in an electronic fashion.

Figure 6:
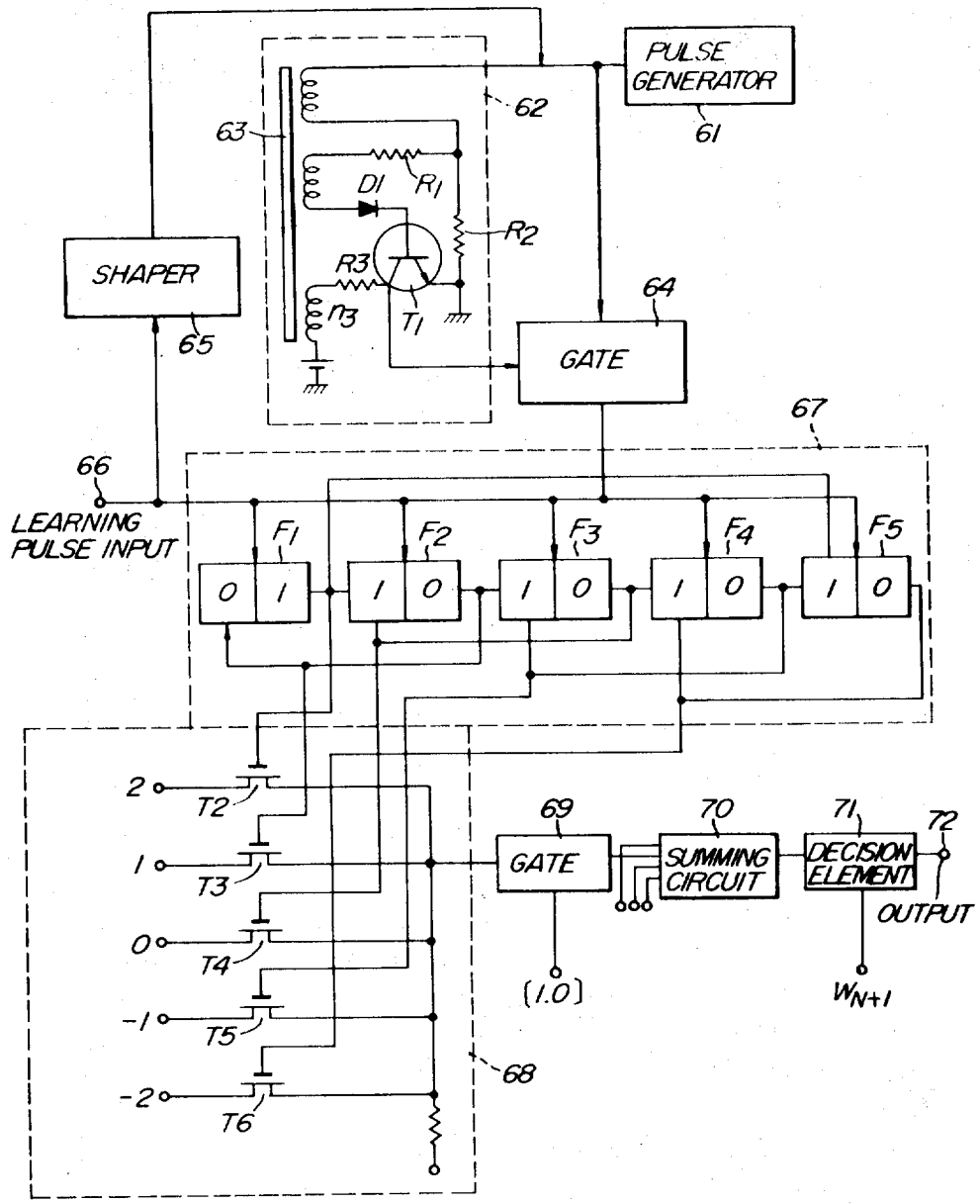
FIG. 6 is a schematic diagram of another embodiment of the present invention.

Another embodiment of the present invention employing a memory core circuit of the kind referred to above will be described with reference to FIG. 6. The embodiment shown in FIG. 6 comprises a pulse generator 61 which generates a train of P pulses (herein P is taken as five), a memory core circuit 62 consisting essentially of a memory core 63, a gate circuit 64, a waveform shaping circuit 65, a learning pulse input terminal 66, a multistable circuit 67 formed by five flip-flop circuits F1, F2, F3, F4 and F5, a weight circuit 68 formed by five MOS field effect transistors T2, T3, T4, T5 and T6, a gate circuit 69, a summing circuit 70, a decision element 71, and an output terminal 72.

The gate terminals of the MOS transistors T2, T3, T4, T5 and T6 are connected to output terminals of the flip-flop circuits F1, F2, F3, F4 and F5, respectively. The MOS transistors T2, T3, T4, T5 and T6 are urged to conduct by an output of the flip-flop circuit which is in a state (0, 1), namely in the state of the flip-flop circuit F1 in FIG. 6. Weights such as "+2," "+1," "0," "−1" and "−2" are applied to input terminals of the respective MOS transistors T2, T3, T4, T5 and T6. Output terminals of these MOS transistors T2, T3, T4, T5 and T6 are coupled together to be connected with the gate circuit 69. A signal passed through the gate circuit 69 is fed into the summing circuit 70 together with a plurality of signals or weights derived from similar circuits so that they are summed up in the summing circuit 70. The decision element 71 acts in a manner similar to the preceding embodiment, that is, the output from the summing circuit 70 is compared with a threshold value $W_{x+1}$ so as to deliver a signal "+1" or "−1" to the output terminal 72.

The learning device shown in FIG. 6 operates in a manner as described below. When a learning pulse is applied to the input terminal 66, the specific state (0, 1) of the flip-flop circuit F1 in the multistable circuit 67 is shifted to the next flip-flop circuit 72 to urge the MOS transistor T3 to conduct. In other words, the MOS transistor T2 having been conducting is cut off and the MOS transistor T3 is now urged to conduct. Then when the next learning pulse is applied to the input terminal 66, a similar operation takes place to urge the MOS transistor T4 to conduct so that the weight applied to the source electrode of the MOS transistor can thereby be selected. Suppose now that the learning process is completed with the flip-flop circuit F3 placed in the specific state. If the power supply is interrupted in the above state, it is unable to identify which of all the flip-flop circuits F1 through F5 in the multistable circuit 67 takes its specific state and the state in which the previous learning process has been completed can not be maintained. To overcome the above difficulty, the position of the specific flip-flop circuit is stored in the memory core circuit in the form of a digital quantity as the learning proceeds. According to the present invention, the level of the memory core is read out in the form of the digital quantity on the basis of the principle described previously. The signal thereby derived is passed through the gate circuit 64 to be applied to the multistable circuit 67 as a learning pulse. This pulse sets the flip-flop circuit F3 in the previous specific state or the state (0, 1) so that the flip-flop circuit F3 can return to its previous state.

It will be appreciated from the foregoing description that the present invention provides a learning device which employs a memory core which stores the memory of the learning state independently of the operation of a multistable circuit having a plurality of stages. Thus, the specific flip-flop circuit in the multistable circuit can be restored to its previous state even if the power supply is interrupted.

What we claim is:

1. A learning device for automatically adapting itself to produce a desired output in response to an input pattern, comprising in combination:
   a. multistage weighting means connected to plural input terminals for producing product signals of the respective inputs and corresponding weights,
   b. means for summing said product signals,
   c. decision means for comparing the sum with a preselected threshold value to deliver a classification output,
   d. logical control means connected between said decision means and weighting means for delivering a sequence of pulses to the latter for successively selecting certain weights of said weighting means for production of said product signals and delivering learning pulses to the latter for shifting said certain weights to obtain said classification output in coincidence with the desired response: wherein said weighting means each comprises magnetic core memory element capable of being magnetized at a certain number of magnetization levels ranging from the negative saturation to the positive saturation with its excitations responsive to the application of the sequence of pulses for presenting the corresponding weight.

2. A learning device according to claim 1, wherein said control means has a pulse generator for generating the sequence of pulses, said weighting means each further comprises a multistable circuit whose specific state shifts from stage to stage with the successive application of the learning pulses thereto, weight supply gate means operable to supply the certain weight by the specific state of said multistable circuit, said memory element being coupled to said multistable circuit to also shift its magnetization level with the application of the learning pulses, said pulse generator being connected to said memory element to supply thereto the same number of excitation pulses as the number of the stages of said multistable circuit in the case of occasional disappearance of the specific state on the circuit and being connected to said multistable circuit to supply thereto a certain number of pulses of said excitation pulses occurring after the establishment of the memory element reset to the negative saturation for restoring its position of the specific state just before the disappearance.

3. A learning device according to claim 1, wherein said memory elements are connected to the respective input terminals, said control means having a constant-voltage pulse generator for supplying the sequence of a predetermined number of pulses to the respective memory elements for shifting their magnetization levels defined as weights, said weighting means digitally supplying to said summing means the product signals of the respective inputs and the corresponding weights each composed of a certain number of pulses supplied from said generator after the establishment of each memory element reset to its saturation in the negative direction.

4. A learning device according to claim 3, wherein said memory element comprises a magnetic core carrying a write-in winding with its one end connected to said pulse generator for the excitation of the core with the application of the sequence of pulses, a feedback winding with its one end connected through a resistor to the other end of said write-in winding and a reset winding with its one end connected through a resistor, the collector and emitter of a transistor and a DC power supply to its other end, and comprises a diode connecting its anode and cathode to the other end of said feedback winding and the base of said transistor respectively, said emitter being connected through a resistor to the other end of said write-in winding for ensuring the stabilized reset operation of the core.